US005390353A

United States Patent [19]

Swanson

[11] Patent Number: 5,390,353

[45] Date of Patent: Feb. 14, 1995

[54] HARDWARE IMPLEMENTAL FIELD ORIENTED BIT STREAM FORMATTER FOR GENERATING USER PROGRAMMED DATA FORMATS

[75] Inventor: Robert E. Swanson, Del Mar, Calif.

[73] Assignee: Eastman Kodak Company, Rochester, N.Y.

[21] Appl. No.: 704,556

[22] Filed: May 23, 1991

[51] Int. Cl.[6] .................... G06F 7/00

[52] U.S. Cl. .................... 395/800; 395/650; 364/DIG. 1; 364/247; 364/259; 364/259.9

[58] Field of Search .................... 395/200, 500, 650, 800, 395/375; 370/99, 94.1, 93.1

[56] References Cited

U.S. PATENT DOCUMENTS 4,168,469 9/1979 Parikh et al. .................... 370/99
4,321,632 3/1982 Leis et al. .................... 360/49
4,433,377 2/1984 Eustis et al. .................... 364/200
4,460,993 7/1984 Hampton et al. .................... 370/99
4,545,052 10/1985 Steirman .................... 370/99
4,567,595 1/1986 Hedlund .................... 371/49.1
5,018,142 5/1991 Simcoe et al. .................... 370/99
5,029,105 7/1991 Coleman et al. .................... 364/518
5,029,163 7/1991 Chao et al. .................... 370/95.1
5,090,029 2/1992 Yamamoto et al. .................... 370/94.1
5,128,929 7/1992 Kobayashi .................... 370/94.1

*Primary Examiner*—Alyssa H. Bowler
*Assistant Examiner*—Mehmet Geckil
*Attorney, Agent, or Firm*—William F. Noval

[57] ABSTRACT

A programmable formatter for providing a data format in response to programmable commands comprises a memory for storing at least program instructions which define the data format; an instruction register for receiving and holding a current program instruction read out of the memory from a given address; a field state machine for indicating when the current program instruction has been completed; an instruction decoder for decoding the program instruction and for specifying information required by a decoded instruction; a repetition counter for counting a number of iterations specified by the current instruction; a data register for storing and outputting fixed patterns specified by the current program instruction; and a next state logic circuit for requesting a next program instruction from the memory when the current program instruction has been completed.

8 Claims, 6 Drawing Sheets

HARDWARE IMPLEMENTAL FIELD ORIENTED BIT STREAM FORMATTER FOR GENERATING USER PROGRAMMED DATA FORMATS

BACKGROUND OF THE INVENTION

1. Field of the Invention

The present invention generally relates to a programmable formatting apparatus for providing information formatting of data. More particularly, the present invention relates to a programmable formatting apparatus which functions in response to a set of programmable commands to independently control field arrangements, size and content of an information format for digital data.

2. Description of the Related Art

Information that is to be conveyed in an intelligent manner is usually packaged in some agreed upon format which facilitates the transmission and receipt of the information in an intelligent form. The format may be nothing more than the layout of printed material on a page or it may be as complex as the information format provided for the new digital audio tape, RDAT.

A good example of the purpose and arrangement of such information formatting is provided by television picture information which is organized before transmission into a series of odd and even lines which then have synchronization signals added. The signals inform the receiver when a horizontal line begins and ends as well as when a new frame begins. Without these added signals, a receiver would have no way of knowing how to reassemble the picture.

In order to transmit data using a digital channel, it is necessary to attach information for synchronization, registration and identification. Specifically, a transmitter for sending digital information through a channel takes in a string of message bits from a source and produces a string of channel bits that are configured to obtain the best performance possible from the proposed channel with its inherent constraints. The difference between the message bit string and the channel bit string is control information that provides the synchronization, registration or alignment, and identification information. These tasks, and others, are accommodated by the attachment of special regions to the message data. The composite structure, i.e., the information format, can, therefore, be expressed as the catenation of fields, each of which has length and contents designed for message data or one of the supporting tasks.

Information formatting is also required in order to record data, and thus, most recording methods require certain formatting to be done. As with the television signal formatting noted above, this recording formatting involves the addition of information and special characteristics to the data during recording in order to make the read process, i.e., playback, successful.

FIG. 1 illustrates the format requirements for a particular magnetic recording device known in the field of data recording. Many different format arrangements are currently used, each of these different formatting arrangements varying in accordance with the particular needs and requirements of the specific application.

Typically, the formatting of data to be recorded is performed by dedicated formatting hardware which formats the data to be recorded in a predetermined format only. As a result, different types of formatting hardware are required to provide the formats.

While hardware is known that can maintain a particular arrangement of format fields, whose size and contents can be changed by programmable values, this type of hardware cannot change the format arrangement Since it is necessary to attach information to data for transmission, and this task imposes a format on data which varies greatly among applications, it is desirable during research and product development to have flexibility in formatting information. Thus, there is a need for formatting hardware that can format data in different ways to eliminate the requirement of purchasing dedicated hardware for each different type of information format.

SUMMARY OF THE INVENTION

Therefore, it is a primary object of the present invention to provide a programmable formatter which functions in response to a set of commands to independently control field arrangements, size and content of an information format.

Another object of the present invention is to provide a programmable formatter in which instructions are executed at real-time speed, real-time speed being defined as the user data rate.

Advantageous features of preferred embodiments of the present invention provide a method for describing formats of arbitrary type in a structured manner. This structure permits the development of a format description language (FDL) to completely and concisely describe any format. Further, the language provides a basis for a programmable formatter, in accordance with the present invention, to function as a special purpose formatting engine capable of accepting FDL programs that will execute any format in real-time.

In this way, a format can be written and executed without hardware changes. The present invention is very useful in the research and development environment or a production environment where one programmable formatter can be used in all members of a product line. Once a suitable format is described for a system, its program can be captured in ROM for production purposes. Alternatively, the program may reside in RAM so that a dynamic format is possible.

These advantages, as well as other advantages of the present invention, will become more apparent in the detailed description of a preferred embodiment presented below.

BRIEF DESCRIPTION OF THE DRAWINGS

The invention will be described with reference to the accompanying drawings wherein:

FIG. 8 illustrates a programmable formatter which is particularly adapted for formatting data to be recorded, for example, on a tape or the like.

DETAILED DESCRIPTION OF PREFERRED EMBODIMENTS FORMAT DESCRIPTION

Figure 1:
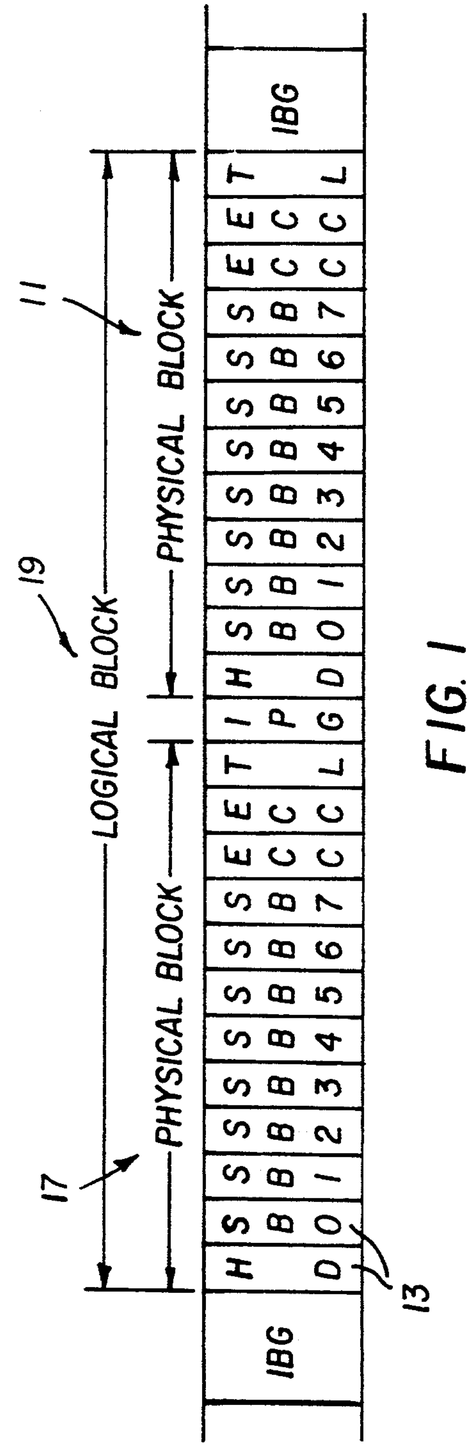
FIG. 1 illustrates a typical structure of a format for a particular magnetic recording device known in the field of data recording.

Referring to FIG. 1, the typical structure of a format, generally indicated at 11, is illustrated by way of example only. It should be noted that in the detailed view of the format 11 provided in FIG. 2, each block or sub-block 13 is divided into several sections, i.e., the Header block is divided into sections PREA, SYNC, ID, CRC, etc., such sections being referred to hereinafter as fields 15. The number attached to any field 15, e.g., SYNC has the number 3, is the field length in bytes. The label in each field 15 is an indication of the contents, which are detailed in the engineering specifications for the drive.

It is valuable to visualize formats as having a component hierarchy. The approach of the present invention is to decompose formats into structures that are easily produced. Thus, according to the present invention, structures of various types can be combined in an ordinary fashion to produce a new structure which is considered to be at a higher level than any of the components in that structure.

Figure 2:
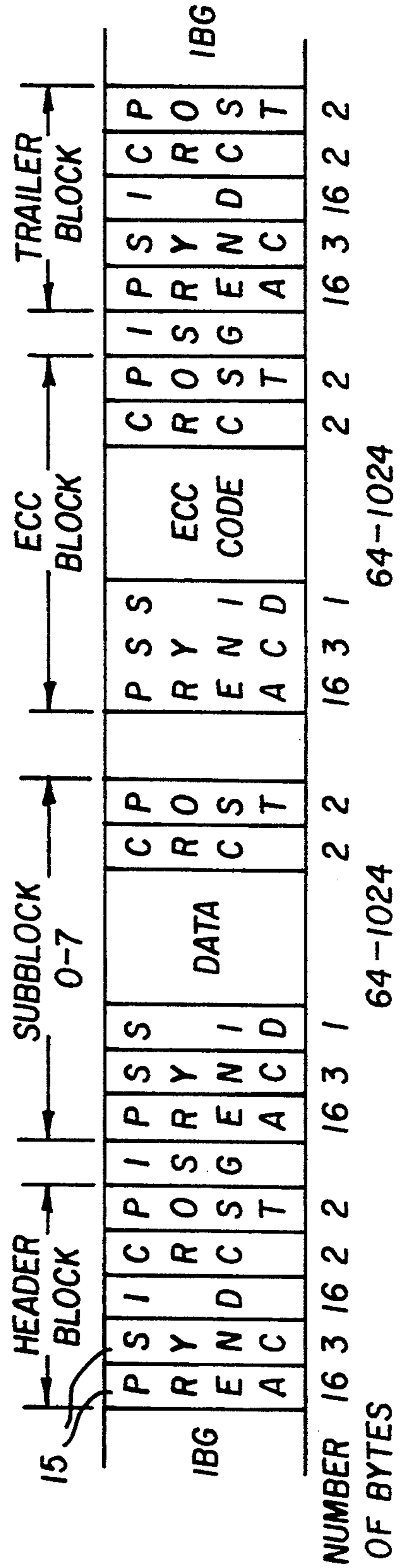
FIG. 2 is a detailed view of the format provided in FIG. 1.
Figure 4:
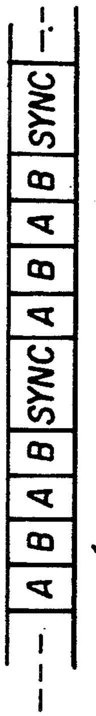
FIG. 4 illustrates a segment of a format different from that of FIG. 1.
Figure 3:
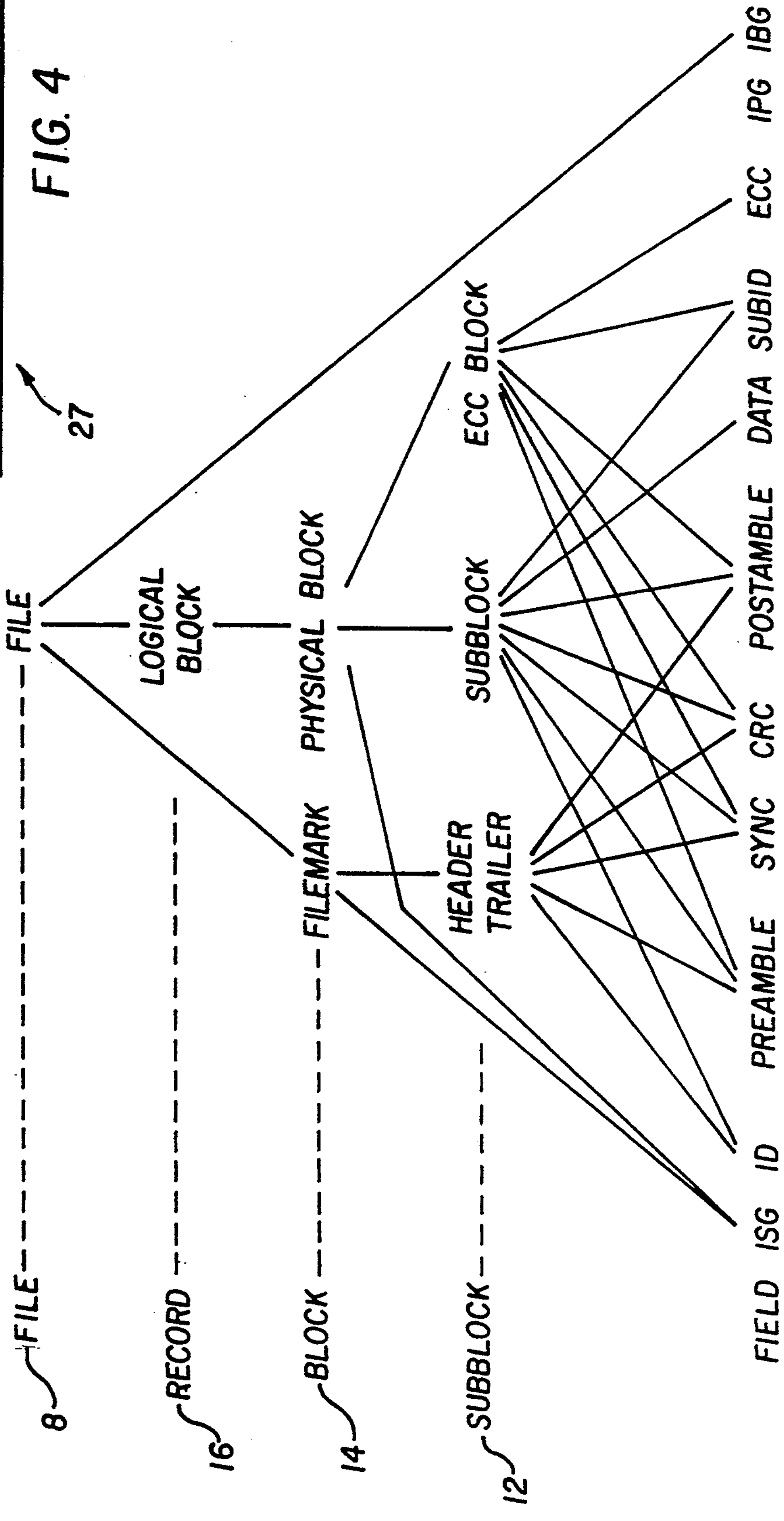
FIG. 3 is a top-down diagram of the hierarchical structure of the format illustrated by FIG. 1.
Figure 5:
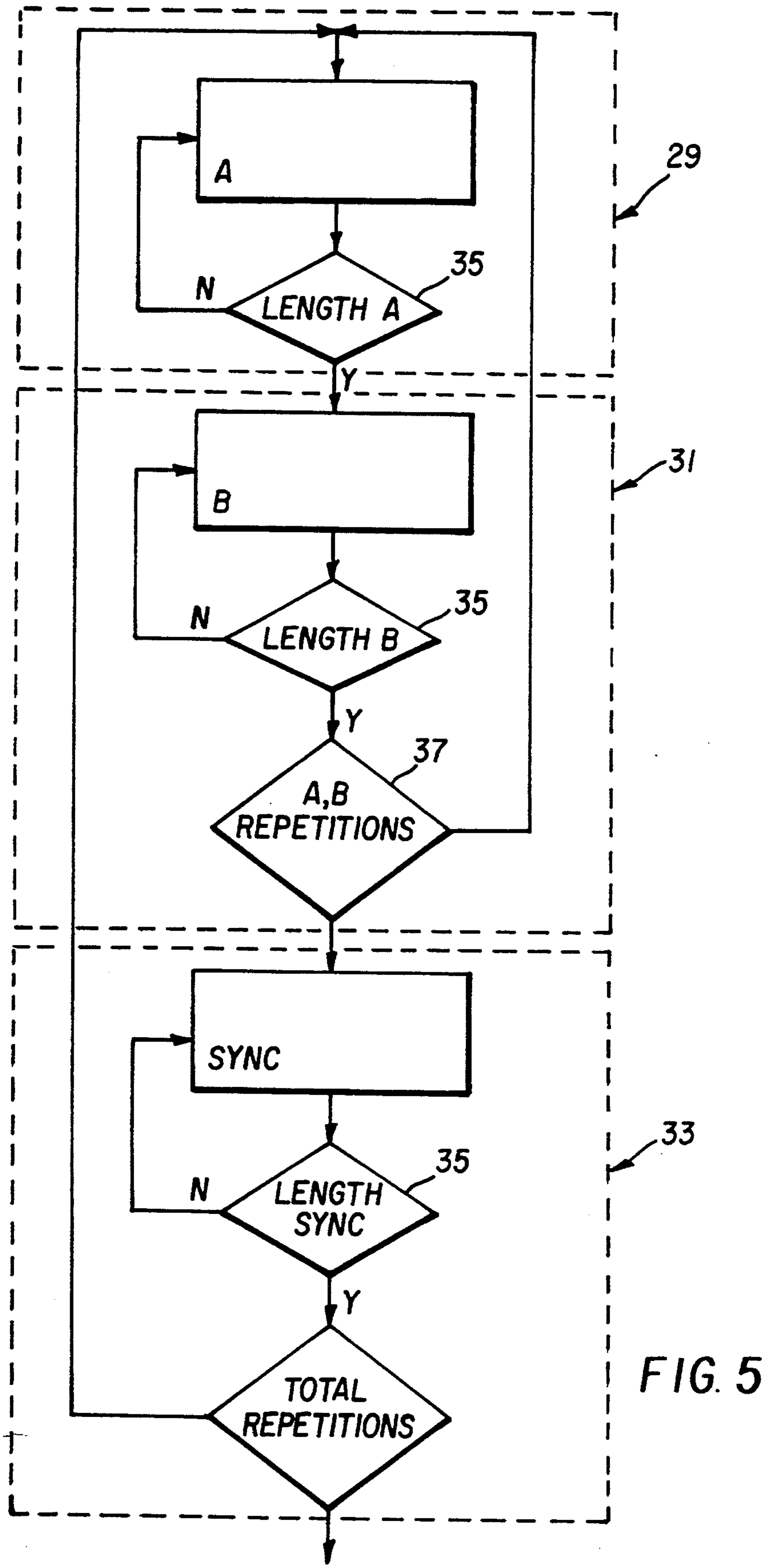
FIG. 5 is a flow chart of the format segment illustrated by FIG. 4.
Figure 6:
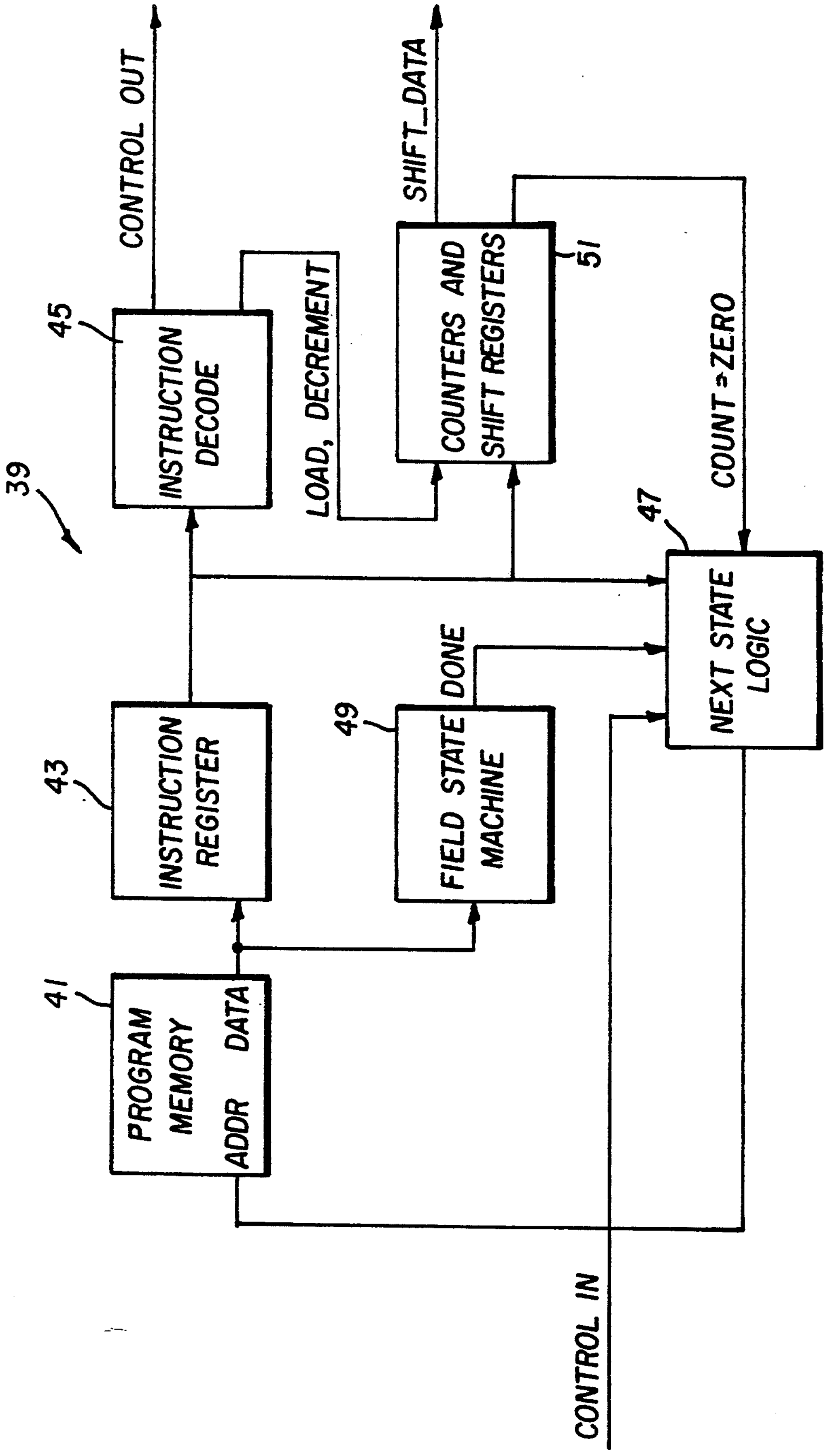
FIG. 6 illustrates one embodiment of the programmable formatter of the present invention.

To illustrate this feature, a top-down diagram of the hierarchical structure of the format illustrated by FIGS. 1 and 2 is provided by FIG. 5. In the diagram of FIG. 5, common structure types are grouped at the same level. The very bottom row of the diagram, labeled FIELD 10, can be thought of as the primitive or basic components of any format. These components are fields of bits to be recorded and control signals that are constant over the field length. During operation, when a field is being executed, the source or pattern of bits to be recorded is selected and control, such as the use of a recording code, is fixed.

Thus, the present invention envisions providing hardware which can successfully produce a field according to the hierarchical approach illustrated by FIG. 5, so that a complete format can be built from those fields. Therefore, the field is the fundamental or primitive element in the format structure as characterized by the present invention.

Higher level structures are thus composed of fields. The level above the primitive level, called SUBBLOCK, is the catenation of various field elements in a specified order to perform a specified task. Subblocks can be catenated in some fixed order to form a higher level assembly called a BLOCK 14. With reference to the format illustrated in FIG. 1, this is called a Physical block, which is generally indicated at 17. This structural process is continued upward and thus, the present invention employs a modular programming structure such as might be implemented using subroutines or procedures.

For nomenclature purposes, the hierarchy diagram is completed by adding the two upper levels which are respectively labeled RECORD 16 and FILE 18. These names are chosen, like most recording format names, arbitrarily but with some conventional use in mind. In this regard, a record is what is labeled in FIG. 1 as a Logical block, generally indicated at 19, and the definition of a file is obvious.

Some additional comments are now provided concerning the construction of the higher level components illustrated in FIG. 5. As is the case with the format illustrated in FIG. 1, the upper level components need not be composed only of elements from the level immediately below. A structure in the hierarchy can thus be made up of elements from any lower level. The Physical block 19 illustrated in FIG. 1, for example, is made up of fields 15 and blocks or subblocks 13. Also, there is no limit to the number or definition of levels in a hierarchy diagram. The important idea recognized by the present invention is that the hierarchy exists. The only limit on the number of levels occurs during implementation when the number of nested references allowed is limited by subroutine calls or stack length.

The smallest unit of the format, the field element, has the following features which are considered fixed for the real-time duration of the field: 1) field length, 2) source of content (a. external, e.g., data or crc, b. known pattern, e.g. preamble), and 3) control flags (a. encoded or unencoded, b. erase, c. various enables). Thus, the present invention envisions using these features to define a field.

Typically, the content of a field element is either some repetition or defined "internal" pattern, such as a preamble for frequency synchronization, or a variable "external" pattern, such as user data (message bits) or identifiers. The length and content of a field element are the most important parameters as characterized by the present invention. In addition to content and length, there can be control flags that are particular to the field itself. The most apparent of these would be a flag to note the need for modulation, such as MFM or RLL coding, and a flag to request data from the user.

Additionally, as noted above, when building formats, some sort of control is required. For instance, when making a physical block in accordance with the format illustrated in FIG. 1, a given number, i.e., eight, of data subblocks are catenated with two ECC subblocks. Thus, in a programmable formatter, it would be most efficient if the fields of one data subblock and one ECC subblock were described and some looping mechanism added to cause iteration of the data and ECC subblock set of fields.

Figure 7:
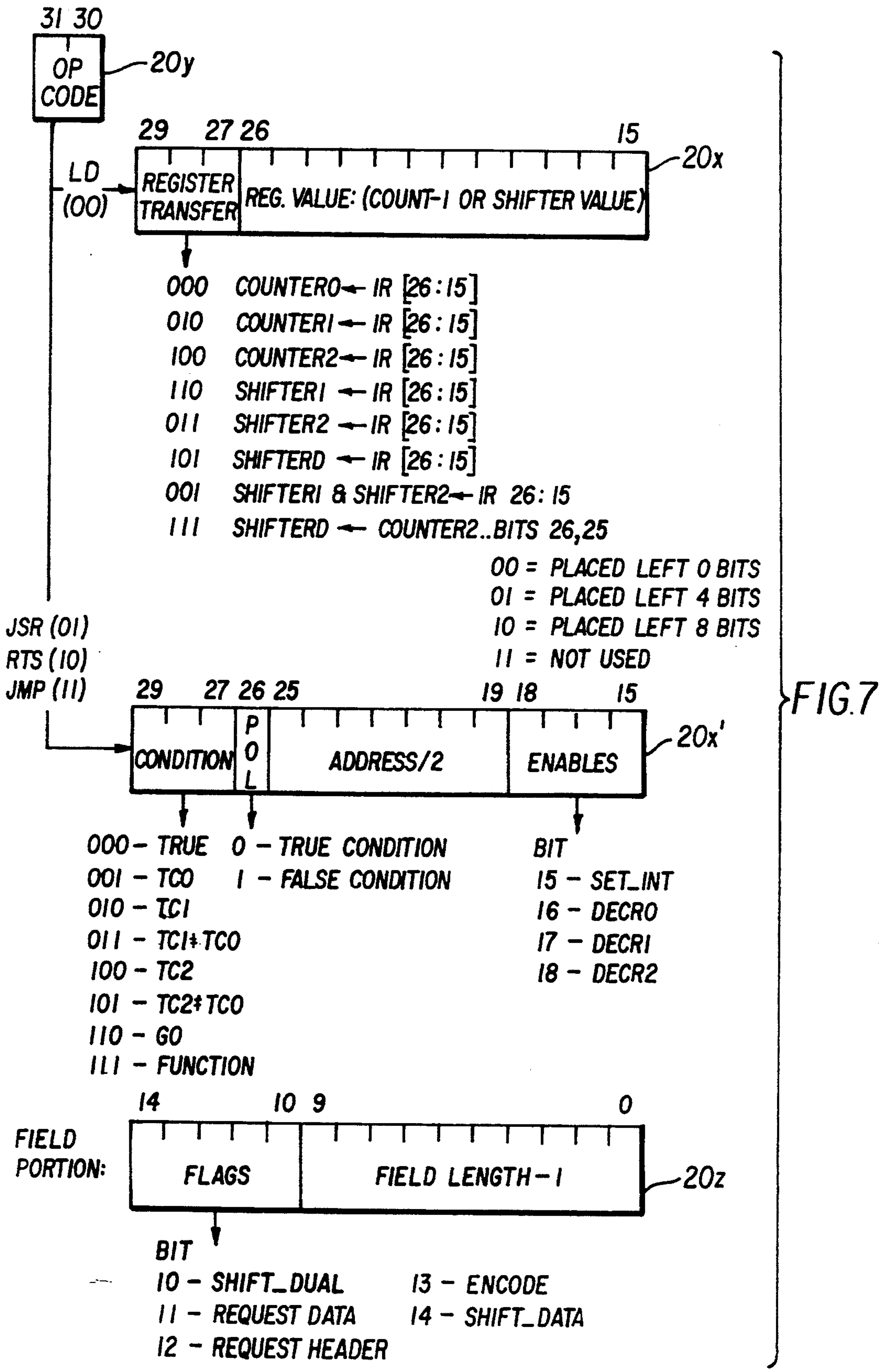
FIG. 7 is a sample format instruction diagram which illustrates the various parts of, for example, a 32-bit instruction outputted by the program memory of the programmable formatter of FIG. 6.
Figure 8:
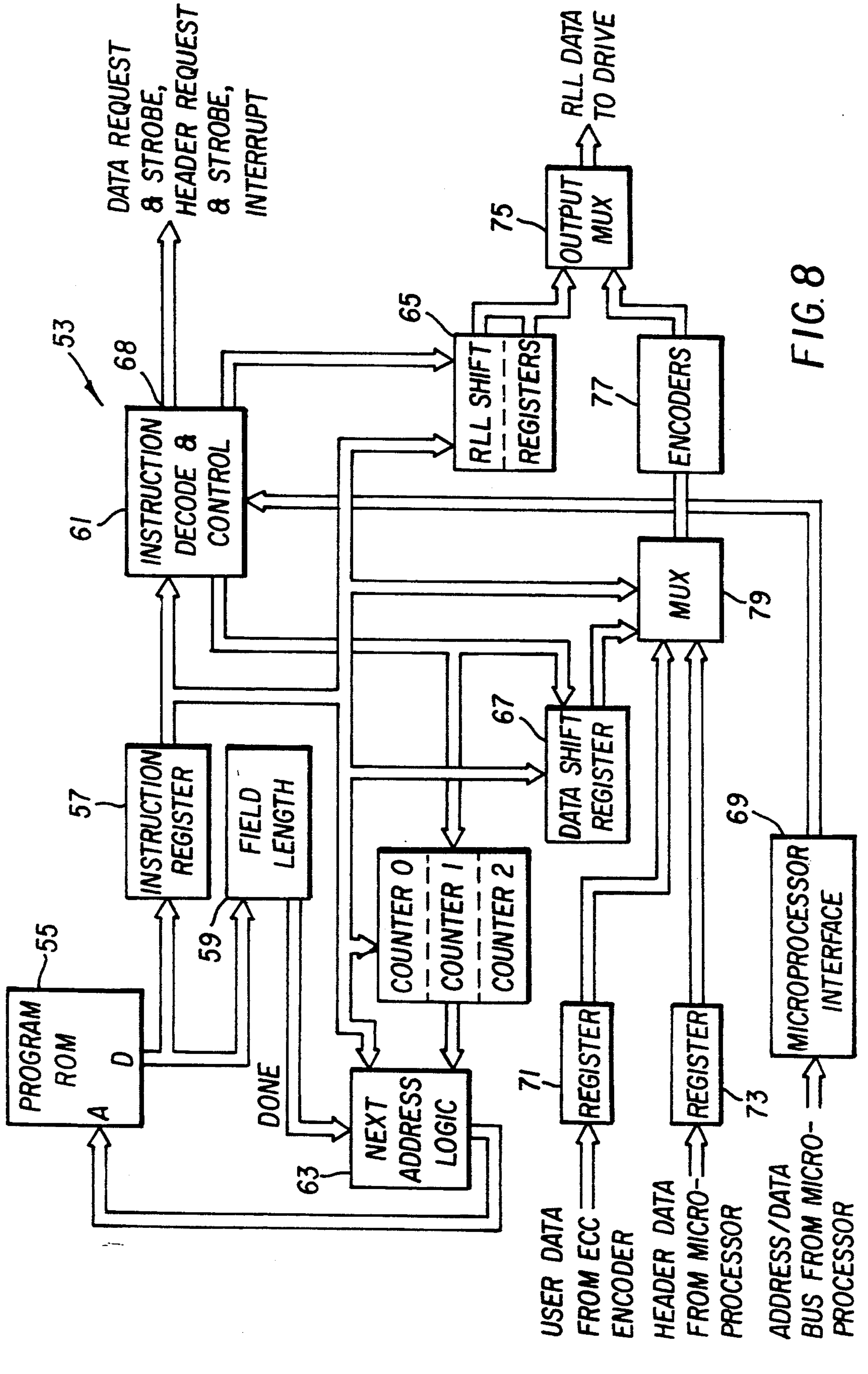

As can be seen from FIG. 7, control of formats usually involves no more than counting a number of iterations of fields or field sets. In this regard, a field set is defined as a collection of specific fields that always occur in the same order to do the same task, such as a header subblock. An external circumstance might influence the choice of the next field in the format. More will be described on control hereinafter in connection with the formatting language developed in accordance with the present invention.

Referring to FIG. 10, the segment of some format 27, different from that shown in FIG. 1, is illustrated for the purpose of describing control flow timing. The format 27 of FIG. 10 requires a field A to be catenated to a field B then A and B again followed by a sync pattern. This string of fields is repeated some number of times. FIG. 11 is a flow chart of this format segment. Charts of this type are called algorithmic state machine (ASM) charts.

An ASM chart of a processing machine is a pictorial representation of the control decisions in that machine. When the flow of control shown in FIG. 11 is partitioned into three areas or boxes, 29, 31 and 33, each area is a state in a synchronous machine. Each of the boxes 29, 31 and 33 can be thought of as a representation of the state itself so that we have states A, B and SYNC illustrated respectively by boxes 29, 31 and 33 in FIG. 11. The areas or boxes each contain only one state.

The decisions enclosed in each area or box are those that must be made during the state time. In every case there is a length decision 35 whose negative response (N) feeds back to the state itself. That feedback path is the field length specification. Other branch decisions involving repetitions, for example, A,B repetitions 37 in box 31, are shown subsequent to the length branches meaning that they are executed preferable only when the length is exhausted.

FORMAT DESCRIPTION LANGUAGE

The following is a discussion of the format description language provided in accordance with preferred embodiments of the present invention. The previous discussion illustrates the importance of timing in format execution. This is in contrast to programming languages where timing is generally not intrinsic. In the present invention, timing is implied. The objective of the format description language (FDL) employed in the present invention is to provide a means for completely describing any format in a concise algorithmic fashion while maintaining an exact, but implied, timing.

The following discussion develops FDL in detail and concludes with a complete description of the format illustrated in FIG. 1. Thereafter, a description of the programmable formatter, which is the subject of the present invention, employing this language will be set forth.

FIELD DESCRIPTION

During execution, it is preferred that the stream of channel bits flows uninterrupted. The field is responsible for maintaining this flow, continuity between field segments over the whole format being the responsibility of the control structure as will be described in more detail hereinafter.

All fields are usually not the same length, therefore, length needs to be specified as a variable. Several possibilities exist when choosing a means of specifying length. The easiest is to include the full value in the instruction. A field length of 1024 bits requires a 10 bit value to be used in the format program. In practice, the hardware will impose limits on values variable in length. The lower limit must be one and the upper limit must not exceed a reasonable number of bits for binary representation. Large fields, i.e., 1K to 8K and more, can be expected in data area of many formats.

The sources of bits for the format can be either internal or external and is selected by a portion of the microword shown. Internal sources are patterns that can be programmed within, for example, a memory. This requires hardware to accept a program value and shift it out. Additionally, common repetitive patterns like the preambles 2T or 3T and the digits one (1) and zero (0) are worth including in special hardware and, therefore, are provided in the list of sources. External sources are those such as data or special identifiers that are not known before a format operation begins. Special identifiers are items such as file directory information or block size and number of blocks. In a disk operation, they can be address values. If the format program memory is a RAM, then certain of these identifiers might be placed in memory before formatting.

The final segment of the field description is the flags. These can be used for communication for external circuitry such as a data request to indicate the exact moment user data is needed by the format.

The syntax of a format field can be summarized in Backus Naur Form (BNF) notation. This notation gives the types of entries, i.e., integer and name, which constitute a field specification. Literals are enclosed in quotes. Braces surround items that may be repeated zero or more times.

fieldSpec ::=integer " " name [", " name] The meaning of the entries is given in the following BNF-like semantic statement. fieldSpec ::=fieldLength " " fieldSource [","  fieldflag]

The above statement provides an explicit description of fields. A 1024 bit data field, requiring modulation coding in the subblock of the format illustrated in FIG. 1, would be written as follows:

1024 ext, enc, req, data The additional programming requirements, such as various bases for number representation and mnemonics, can be added in an assembler. Here the base usually will always be 10, unless noted otherwise, and mnemonics are preferably chosen for readability.

The significant notions, then, involved in control are:

1. Use of loop counters;
2. Branching that supports hierarchical descriptions; and
3. Use of programmable registers to hold loop counts or fixed pattern contents. Below is the BNF syntax for control specifications. The vertical bar symbol (/) represents alternatives. Optional items are enclosed in <>.

```
    controlSpecs ::= loadregister / conditional
jump
    loadRegister ::= "ld " name "," integer
conditionalJump ::= name <"!"> name "," address
[",""name]
    Address:: = integer / name
```

A semantic similar to that for the field is shown below for the alternatives of the control segment.

```
loadRegister ::= "ld " registername ","
registerValue
conditionalJump ::= opCode <"1">condition ","
destination
    ["," countEnables]
```

The complete BNF grammar for FDL is set forth below.

BNF Format Syntax

```
format ::= version [ comment / statement] endFormat
version ::= "V" integer ";"
statement ::= <label> <formatAction> ";" <comment>
label ::= name ":"
formatAction ::= fieldSpec <"/" controlSpec> ";"
fieldSpec ::= integer "," name ["," name]
controlSpec ::= loadRegister / conditionaljump
loadRegister ::= "ld " name "," integer
conditionalJump ::= name <"/"> name "," address [","
name]
address ::= integer / name
comment ::= "#" characterString ";"
endFormat ::= "ENDFILE;"
```

Format Semantics

```
version ::= "V" versionNumber ";"
fieldSpec ::= fieldLength "," fieldSource [","
```

-continued

| Format Semantics |
| --- |
| fieldFlag] |
| loadRegister ::= "ld " registerName "," registerValue |
| conditionalJump ::= opcode <"/">condition "," destination |
| ["," counterEnables) |

With the language in place, it is appropriate that a complete descriptive example of the format illustrated in FIG. 1 be included. FIG. 15 is that description with comments.

THE PROGRAMMABLE FORMATTER

The elements of the programmable formatter, generally indicated at 39 in FIG. 16, comprise a microsequencer. The architecture of the programmable formatter 39 is essentially that of a memory-driven clocked state machine.

The programmable formatter includes a program memory 41, which stores the program instructions that describe the format hierarchy, each instruction comprising, for example, 32 bits (see FIG. 17), which are read out of the data port DATA in accordance with a given address received at the address port ADDR. An instruction register 43, which is connected to the data port DATA of the program memory 41, captures and holds, for example, the twenty two most significant bits (MSBs) of each instruction read out from the program memory 41, appropriate portions of these twenty two MSBs being provided to other elements of the programmable formatter 39 as will be more fully described with particular reference to FIG. 17.

An instruction decoder 45, connected to the output of the instruction register 43, receives and decodes that portion of each program instruction which requires decoding to see what the instruction requires. The instruction decoder 45 has a control output port for communicating control instructions to the outside world, for example, a microprocessor (not shown), which then provides control inputs to a next state logic circuit 47 via a control in port thereof.

The next state logic circuit 47, also connected to the output of the instruction register 43, receives that portion of the program instruction from the instruction register 43 which indicates the next address, i.e., next state, of the program instruction to be provided by the program memory 41. The next state logic circuit 47 provides this next address to the address port ADDR of the program memory 41 in accordance with a DONE signal received from a field state machine and/or in accordance with the control input provided from microprocessor via the control in port.

The field state machine 49, connected to the data port DATA of the memory 41, receives, for example, the ten least significant bits (LSBs) of the 32-bit program instruction read out from the program memory 41 to establish the time length (number of clock pulses) of the instruction, i.e., the total time required to perform the particular instruction. The field state machine 49 is essentially a counter which counts down the number of clock pulses as specified by the 10 LSBs and provides the DONE signal to the next state logic circuit 47 when decremented to zero to indicate to the next state logic circuit 47 that the current instruction has been completed.

Also connected to the output of the instruction register 43 as well as to the instruction decoder 45 are counters and shift registers 51. The counters, for example, three counter, keep track of the various states of the formatter 39, i.e., the counters form a control type device for building loops and performing iteration operations within the program in accordance with inputs received from the instruction register 43 and the instruction decoder 45. The counters also indicate to the next state logic circuit 47 when the iterations have been completed. The shift registers, for example three shift registers, permit the building of data of fixed patterns, from the program instructions, which are transmitted to the formatted data stream via a Shift_data output port for merging with user data to form a complete data format stream.

FORMAT INSTRUCTION DIAGRAM

Referring to FIG. 17, a sample format instruction diagram is provided which illustrates the various parts of, for example, a 32-bit instruction outputted by the program memory 41. The 32-bit instruction comprises a control portion $20_x$, $20_y$, $20_z$ which includes bits 15–31 of the instruction and a field portion ($20_z$) which includes a flag portion (bits 10–14 labeled Flags) and the 10 LSBs (bits 0–9 labeled field length).

The control portion, which is provided to the instruction decoder 45 for decoding, will always be either a load instruction (LD) or a branch instruction (JSR, RTS, JMP). The bits 31 and 30 ($20_y$) of the control portion indicate to the instruction decoder 45 whether or not the control portion $20_y$ is a load instruction (LD) or a branch instruction (JSR, RTS, JMP).

If the control portion $20_y$ is a load instruction, the programmable formatter 39 looks at bits 27, 28, 29 (labeled Register Transfer) ($20_x$) which designate the identity of one of the counters or registers or a combination thereof and bits 26–15 indicate what to load into the designated counter and/or shift register. This information, once decoded by the instruction decoder 45, is loaded into the counters and shift registers 51.

If the control portion $20_y$ is a branching instruction (JSR, RTS, JMP), bits 27–29 ($20_x'$)(labeled Condition) indicate what the branching condition will be, i.e., what condition must be satisfied in order to execute the branching instruction. For example, tc0 indicates when counter 0 has exhausted, tc1 indicates when counter 1 has exhausted, tc1*tc0 indicates when counters 1 and 0 have exhausted, and go and function relate to external control inputs from, for example, the microprocessor. Bit 26 ($20_x'$) (labeled Polarity) indicates whether or not it is necessary to consider if the condition is true or false. Bits 19–25 indicate the address of the branching instruction, i.e., where to jump, and bits 15–18 (labeled Enables) indicates when to decrement a counter, i.e., to set an interim, and is active only during the last clock pulse of an instruction.

The field portion includes bits 0–9 ($20_z$) (labeled Field length) which do not require decoding and are typically inputted directly from the program memory 41 to the field state machine 49 to indicate the length of the instruction. Bits 10–14 design the type of flag, for example, a request data flag indicate when to provide user data. The flag is active during the entire instruction.

In operation, bits 15–26 of a load instruction $20_x$), i.e., the value to be loaded into a counter and/or shift registers 51, are inputted to the counters and shift registers 51 from the instruction register 43. The instruction decoder 45 receives bits 30–31 to determine the op code, i.e., load or branch, and also receives bits 27–29 from the instruction register 43 to determine if the instruction is a register transfer or what the condition is. The decoder 45 also receives bit 26 to determine polarity of the condition.

The next state logic circuit 47 receives address bits 19–25 as well as some of the bits on the condition check of a branching instruction. Once the conditions are satisfied and the designated counters have decremented to zero, the next state logic circuit 47 outputs the address information to the program memory 41 to designate the address of the next instruction to be outputted by the memory 41.

All actions within the formatter 39 preferably take place on the rising edge of a clock. In order to describe a state machine, there must be a specification of both next state and output for each present state. Each FDL statement is, therefore, a present state in which the control indicates next state. Output is the flags as well as register and counter designations.

When DONE is active in the field state machine 49, the memory contents are clocked into the instruction register 43 from the program memory 41. The next state logic circuit 47 uses the appropriate bits of the instruction register 43 to select condition(s) which fix the state of the next FDL statement. That statement is at the immediate jump address, at the subsequent memory location or at a saved subroutine return address. The instruction decode 45 is combinational logic that looks at the operation codes and flag bits in the instruction register 43 to produce outputs that manage the register/counters 51 and external flags.

Because field production is largely a background operation, a field is initiated by a program instruction and runs until finished. When finished, the programmable formatter 39 completes its instruction control and starts another field. Following reset, the field state machine 49 runs as a modulo n counter when the value $n-1$ is loaded. Loading takes place each time the counter contents are zero (DONE is active). The exact value of $n-1$ is taken from the FDL program instruction stored in and outputted by the memory 41, i.e., bits 0–9 of FIG. 17. In this way, the program is advanced to the next instruction and the field length is modified on completion of the current field.

As noted above, the counters and shift register 51 include, for example, three counters which are preferably parallel load registers that are decremented when the count enables (ce) signal is applied. Each of these parallel load registers indicates to the next state logic circuit 47 when its contents are zero. Of the three counters, one is provided of the field length and one each of the two repetition amounts as defined by the flow diagram of FIG. 11.

The instruction and all counters are preferably updated at the end of the last clock cycle of the field. During execution of the field, only the field counter changes. When it decrements to 0, thus terminating its count, the values of repetition counters are examined. Change of state takes place only when the field length counter is 0. Other counters may also terminate, but their values need not be checked for branching purposes unless the field counter reaches 0.

The formatting operation can be thought of as a partitioned state machine. The first partition is the field and the second is the flow control. The second partition is preferably subordinate to the first. That is, the second partition has the DONE signal from the first as an input. DONE is preferably active for the control partition to advance. Every clock causes the field state machine 49 to advance. Every clock preferably accounts for exactly one channel bit.

Many of the fields that are catenated onto the actual data during formatting are constants. Such things as preamble and synchronization are fields whose contents can be named in the format program and loaded into the shift registers of the counters and shift registers 51. The formatter 39 preferably makes provision for preamble patterns, for example 2T and 3T. User particular patterns are made up of individual instructions whose source is vector ones and zeroes.

Preferably a parallel load shift register is provided to simplify these descriptions. The instruction to load this register is the same as the instruction that loads a loop counter. The register is not shifted or selected for output, however, until the SHFTR bit is set in the field specification.

A programmable formatter 53 is illustrated in FIG. 27 which is particularly adapted for formatting data to be recorded, for example on a tape or the like. As with the arrangement shown in FIG. 16, the formatter 53 includes a program memory (ROM) 55 for storing the program instructions, an instruction register 57 and a field length counter (field state machine) 59 connected to the data output port D of the program ROM 55, and an instruction decoder and control circuit 61 connected to the output of the instruction register 57.

In a manner similar to the programmer shown in FIG. 16, also connected to the output of the instruction register 57 are the next state logic circuit 63 as well as counters 0, 1, 2, run length limited (RLL) shift registers 65 and the data shift register 67. As previously described, the next state logic circuit 63 is connected to the output of the field length counter 59 for receiving the DONE signal upon expiration of the time length of the instruction.

The instruction decode and control circuit 61 has an output connected to counters 0, 1, 2, (RLL) shift registers 65 and the data shift register 67 and further includes a control output port 68 which permits communication with the outside world, for example a microprocessor (not shown), these communications including, for example, a request data signal generated in response to an instruction flag for requesting data, a request header signal also generated in response to an instruction flag and an interrupt signal generated in response to an instruction enable signal. A microprocessor interface circuit 69 is provided for inputting control signals from the microprocessor to the instruction decode and control circuit 61 to permit the microprocessor to "talk" to the formatter 53, for example, to provide a GO instruction and the like.

User data and header data requested from the microprocessor by the instruction decode and control circuit 61 are received and held by registers 71, 73, respectively. These data are provided to a mux 75, for transmittal to recording tape, via encoders 77 and a mux 79 having inputs connected, respectively, to the data shift register 67, and the registers 71 and 73. The mux 79 is also connected to the instruction register 57 to receive control instructions as to which of the registers 67, 71 and 73 data are to be received from. The encoders 77 are provided to encode the data outputted from the mux 79 so as to be comparable with the RLL format provided from the RLL shift registers 65, this RLL format being a customized requirement for the application of formatting data for recording on a tape medium.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

I claim:

1. A programmable formatter for formatting digital bit stream information from a cooperating microcomputer digital source, said formatter comprising:

an addressable memory having an address port and a data port for storing program instructions which define a data format, a next state logic circuit for requesting a next program instruction from said addressable memory upon completion of execution of a current program instruction, an instruction register for receiving and holding said current program instruction read out of said data port of said memory from a given address provided by said next state logic circuit;

a field state machine, coupled to said memory to receive instruction length information from said next state logic circuit, for indicating when said current program instruction has been completed and for requesting said next program instruction from said addressable memory be transferred to said instruction register;

instruction decoder, coupled to said instruction register to receive said current program instruction read out from said data port, for decoding said current program instruction;

a repetition counter, coupled to said instruction decoder, for counting a number of iterations of portions of said digital information as specified by said current program instruction;

a data register, coupled to said instruction decoder, for storing and outputting programmed data packets of said digital information as specified by said current program instruction;

said formatter further wherein each program instruction defines at least one of a field and field set of the data format, wherein a field set is a collection of fields of said digital information occurring in a specified order;

said formatter further wherein each program instruction includes a length portion for setting a length of each field, a content portion for indicating the content of each field, and a control portion for specifying a control for each program instruction; and wherein the content portion of each program instruction specifies one of a defined internal pattern and a variable external pattern.

2. A programmable formatter according to claim 1, wherein the control portion specifies one of a load instruction and a branch instruction.

3. A programmable formatter according to claim 2, wherein the load instruction identifies at least one of the repetition counter and the data register and a value to be entered.

4. A programmable formatter according to claim 3, wherein the branch instruction specifies a condition for the branch instruction, an address of the branch when the condition is satisfied and an enable signal for indicating completion of the branching instruction.

5. A programmable formatter according to claim 4, wherein internal patterns are stored in said memory at given addresses.

6. A programmable formatter according to claim 5, wherein said instruction decoder has a control output port for requesting one of a variable external pattern and external control signals.

7. A programmable formatter according to claim 6, wherein said next state logic circuit includes a control input port for receiving external control signals.

8. A programmable formatter according to claim 7, wherein said data register comprises a plurality of data registers and wherein a multiplexer is further provided for selecting a given one of the plurality of data registers for output of the fixed pattern stored thereby.

* * * * *